United States Patent
Yamashita (10) Patent No.: US 10,725,253 B2
(45) Date of Patent: Jul. 28, 2020

(54) OPTICAL MULTIPLEXER/DEMULTIPLEXER, OPTICAL SUBASSEMBLY, AND OPTICAL MODULE

(71) Applicant: Lumentum Japan, Inc., Kanagawa (JP)

(72) Inventor: Takeshi Yamashita, Ninomiya-machi (JP)

(73) Assignee: Lumentum Japan, Inc., Kanagawa (JP)

( * ) Notice: Subject to any disclaimer, the term of this patent is extended or adjusted under 35 U.S.C. 154(b) by 0 days.

(21) Appl. No.: 16/214,271

(22) Filed: Dec. 10, 2018

(65) Prior Publication Data

US 2019/0187390 A1    Jun. 20, 2019

(30) Foreign Application Priority Data

Dec. 19, 2017 (JP) ................. 2017-242518

(51) Int. Cl.
*H04J 14/02* (2006.01)
*G02B 6/42* (2006.01)
*G02B 6/293* (2006.01)

(52) U.S. Cl.
CPC ......... *G02B 6/4215* (2013.01); *G02B 6/2938* (2013.01); *G02B 6/425* (2013.01); *H04J 14/02* (2013.01)

(58) Field of Classification Search
CPC .... G02B 6/4215; G02B 6/2938; G02B 6/425; G02B 6/4296; G02B 6/4246; G02B 6/29307; H04J 14/02

USPC ..................................................... 398/43–103
See application file for complete search history.

(56) References Cited

U.S. PATENT DOCUMENTS

| | | | | | |
|---|---|---|---|---|---|
| 4,765,715 | A | * | 8/1988 | Matsudaira | G02B 27/106 359/583 |
| 5,071,225 | A | * | 12/1991 | Inoue | G02B 27/1006 359/589 |
| 5,583,683 | A | * | 12/1996 | Scobey | G02B 5/288 398/79 |
| 5,793,912 | A | * | 8/1998 | Boord | H04J 14/02 359/15 |

(Continued)

FOREIGN PATENT DOCUMENTS

| CN | 101458370 A | 6/2009 |
|---|---|---|
| CN | 103809255 A | 5/2014 |

(Continued)

*Primary Examiner* — Dibson J Sanchez
(74) *Attorney, Agent, or Firm* — Harrity & Harrity, LLP (57) ABSTRACT

An optical multiplexer/demultiplexer may include some beam splitters on the first surface, a first reflector on the first surface and between the beam splitters, and a second reflector on the second surface. Light propagates between the first surface and the second surface. The light transmission body has some first input/output sections on the first surface for inputting or outputting the respective signal beams. The light transmission body has a second input/output section on the second surface for inputting or outputting the multiplexed signal beam. Each of the beam splitters is placed at a corresponding one of the first input/output sections to pass a corresponding one of the signal beams. The first reflector stays away from any one of the first input/output sections.

20 Claims, 8 Drawing Sheets

(56) References Cited

U.S. PATENT DOCUMENTS

| | | | | |
|---|---|---|---|---|
| 5,835,517 A * | 11/1998 | Jayaraman | G02B 6/29358 | 372/50.124 |
| 5,894,535 A * | 4/1999 | Lemoff | G02B 6/125 | 385/14 |
| 6,075,632 A * | 6/2000 | Braun | G01J 3/36 | 359/634 |
| 6,147,806 A * | 11/2000 | Park | G02B 27/1006 | 359/634 |
| 6,404,947 B1 * | 6/2002 | Matsuda | B82Y 20/00 | 372/50.1 |
| 6,454,465 B1 * | 9/2002 | Uschitsky | G02B 6/29364 | 385/34 |
| 6,563,976 B1 * | 5/2003 | Grann | G02B 6/29311 | 385/24 |
| 6,751,373 B2 | 6/2004 | Jeong | | |
| 6,768,834 B1 * | 7/2004 | Gruhlke | G02B 3/0031 | 385/129 |
| 6,775,439 B2 * | 8/2004 | Takano | G02B 6/12007 | 385/129 |
| 6,819,871 B1 * | 11/2004 | Baldwin | G02B 5/281 | 359/634 |
| 7,212,343 B1 * | 5/2007 | He | G02B 6/29365 | 359/618 |
| 7,366,371 B1 * | 4/2008 | Wen | G02B 6/4214 | 385/15 |
| 8,303,195 B2 * | 11/2012 | Adachi | G02B 6/4204 | 385/73 |
| 8,540,437 B2 * | 9/2013 | Lee | G02B 6/4215 | 385/31 |
| 8,830,587 B2 * | 9/2014 | Bhatia | H01S 5/4012 | 359/589 |
| 9,485,046 B1 * | 11/2016 | Tang | H04J 14/02 | |
| 9,551,833 B1 * | 1/2017 | Li | H04J 14/02 | |
| 10,182,275 B1 * | 1/2019 | Xiao | G02B 6/24 | |
| 10,187,175 B2 * | 1/2019 | Iwasaki | G02B 6/2938 | |
| 2002/0057868 A1 * | 5/2002 | Wu | G02B 6/29367 | 385/24 |
| 2002/0154857 A1 * | 10/2002 | Goodman | G02B 6/2713 | 385/24 |
| 2002/0181046 A1 * | 12/2002 | Jeong | G02B 6/29362 | 398/79 |
| 2003/0099434 A1 * | 5/2003 | Liu | G02B 6/29367 | 385/31 |
| 2003/0152113 A1 * | 8/2003 | Kropp | G02B 6/29367 | 370/535 |
| 2003/0190126 A1 * | 10/2003 | Toyoshima | G02B 5/285 | 385/120 |
| 2004/0013366 A1 * | 1/2004 | Morris, Jr. | G02B 6/29367 | 385/39 |
| 2004/0101247 A1 * | 5/2004 | Chen | G02B 6/29367 | 385/47 |
| 2004/0208452 A1 * | 10/2004 | Kropp | G02B 6/29367 | 385/47 |
| 2005/0031256 A1 * | 2/2005 | Paatzsch | G02B 6/29365 | 385/24 |
| 2005/0135731 A1 * | 6/2005 | Welch | B82Y 20/00 | 385/14 |
| 2006/0078252 A1 * | 4/2006 | Panotopoulos | G02B 6/29367 | 385/24 |
| 2008/0175591 A1 * | 7/2008 | Yu | G02B 6/2706 | 398/65 |
| 2008/0292317 A1 * | 11/2008 | Wen | G02B 6/29367 | 398/79 |
| 2012/0189306 A1 * | 7/2012 | Du | H01S 5/02284 | 398/65 |
| 2013/0301137 A1 * | 11/2013 | Fattal | G02B 27/106 | 359/618 |
| 2013/0330080 A1 * | 12/2013 | Li | H04J 14/02 | 398/79 |
| 2014/0133862 A1 | 5/2014 | Fujimura et al. | | |
| 2015/0037037 A1 * | 2/2015 | Kaneko | H04B 10/503 | 398/79 |
| 2015/0136957 A1 | 5/2015 | Iemura et al. | | |
| 2015/0311995 A1 * | 10/2015 | Wang | G02B 6/2938 | 398/49 |
| 2015/0365175 A1 * | 12/2015 | Kawamura | H01J 14/04 | 398/79 |
| 2016/0195677 A1 * | 7/2016 | Panotopoulos | G02B 6/4214 | 250/227.23 |
| 2016/0246008 A1 * | 8/2016 | Tan | G02B 6/29365 | |
| 2017/0131474 A1 * | 5/2017 | Dannenberg | H04J 14/02 | |
| 2017/0230116 A1 * | 8/2017 | Sorin | H01S 5/026 | |
| 2017/0254958 A1 * | 9/2017 | Yue | G02B 6/327 | |
| 2017/0285269 A1 * | 10/2017 | Yue | G02B 6/32 | |
| 2017/0351041 A1 * | 12/2017 | Mathai | G02B 6/4215 | |
| 2018/0031768 A1 * | 2/2018 | Miyata | G02B 6/29367 | |
| 2018/0052284 A1 * | 2/2018 | Matres | G02B 1/11 | |
| 2018/0212708 A1 * | 7/2018 | Tian | H04J 14/06 | |
| 2019/0103936 A1 * | 4/2019 | Kawamura | G02B 6/34 | |

FOREIGN PATENT DOCUMENTS

| | | |
|---|---|---|
| CN | 107678107 A | 2/2018 |
| JP | 2014-095843 A | 5/2014 |
| JP | 2015-096878 A | 5/2015 |

* cited by examiner

OPTICAL MULTIPLEXER/DEMULTIPLEXER, OPTICAL SUBASSEMBLY, AND OPTICAL MODULE

CROSS-REFERENCE TO RELATED APPLICATION

The present application claims priority from Japanese application JP2017-242518 filed on Dec. 19, 2017, the content of which is hereby incorporated by reference into this application.

BACKGROUND

1. Field

This relates to optical multiplexer/demultiplexers, optical subassemblies and optical modules.

2. Description of the Related Art

Wavelength division multiplexing (WDM) is known as one of communication technologies to transmit and receive several optical signals with different wavelengths by combining them into a single fiber strand. A transmitter optical subassembly (TOSA) and a receiver optical subassembly (ROSA) for the WDM have a multiplexer (MUX) and a demultiplexer (DEMUX) respectively for multiplex or demultiplex the optical signals (JP 2014-95843A, JP 2015-96878A). The MUX/DEMUX has a reflector on an incoming/outgoing side of light and has a wavelength filter on an optical element side for partially passing and partially reflecting light, enabling the light to be repeatedly reflected between them and to be multiplexed or demultiplexed.

Multichannel optical subassemblies (TOSA, ROSA) require downsizing, and hence an array element, where optical elements for multiple channels are monolithically integrated, is preferable to be used. Also, an integrated circuit (e.g. amplifier for ROSA) to be connected to the optical elements is compatible with the multiple channels.

The multichannel optical element array and the integrated circuit may face its yield rate problem, when trying to be compatible with more channels (e.g. 8 channels). Any multichannel product with an unsatisfied characteristic for one channel cannot be used, inevitably leading to a lower manufacturing yield rate. The more the channels increase in number, the lower the yield rate becomes, eventually leading to higher prices of individual products. The higher manufacturing yield rate of the products may be achieved by separately preparing each element, instead of monolithically integrating the elements for the multiple channels. Compared with the multichannel product, the way of separately preparing each element makes its yield rate higher but raises a problem of making its entire size larger and its manufacturing cost higher due to necessity for more parts.

SUMMARY

This is to aim at curtailing decrease in yield rates or increase in manufacturing costs.

(1) An optical subassembly may include some optical elements for inputting or outputting respective signal beams with different wavelengths; and an optical multiplexer/demultiplexer for converting between the signal beams and a multiplexed signal beam. The optical multiplexer/demultiplexer includes a light transmission body with a first surface and a second surface parallel and opposed to each other, some beam splitters on the first surface, a first reflector on the first surface and between the beam splitters, and a second reflector on the second surface. The light transmission body passes light to be reflected on the beam splitters, the first reflector, and the second reflector, the light propagating between the first surface and the second surface. The light transmission body has some first input/output sections on the first surface for inputting or outputting the respective signal beams, the light transmission body having a second input/output section on the second surface for inputting or outputting the multiplexed signal beam. Each of the beam splitters is placed at a corresponding one of the first input/output sections to pass a corresponding one of the signal beams. The first reflector stays away from any one of the first input/output sections.

With the first reflector placed between the beam splitters, there is no need for the optical element placed to be opposed to the first reflector. This enables some of the optical elements to be integrally placed, curbing decrease in yield rates or increase in manufacturing costs.

(2) In the optical subassembly according to (1), the beam splitters may be optical filters, and the first reflector and the second reflector are reflective films.

(3) In the optical subassembly according to (1) or (2), the first input/output sections may fall into some groups, each of which includes corresponding ones of the first input/output sections. The closest pair of the first input/output sections in an adjacent pair of the groups may have a greater pitch therebetween than another pitch at which an adjacent pair of the corresponding ones of the first input/output sections in each of the groups is placed. The light transmission body may have a non-input/output section between the adjacent pair of the groups. The first reflector may be placed at the non-input/output section. The non-input/output section and a corresponding one of the first input/output sections next to each other may have a pitch therebetween equal to the pitch at which the adjacent pair of the corresponding ones of the first input/output sections in each of the groups is placed.

(4) In the optical subassembly according to (3), the non-input/output section may include some non-input/output sections. The first reflector may be placed at each of the non-input/output sections. An adjacent pair of the non-input/output sections may have a pitch therebetween equal to the pitch at which the adjacent pair of the corresponding ones of the first input/output sections in each of the groups is placed.

(5) In the optical subassembly according to any one of (1) to (4), the optical elements may fall into some sets, each of which includes corresponding ones of the optical elements. The closest pair of the optical elements in an adjacent pair of the sets may be separated from each other at a greater distance than another distance between an adjacent pair of the corresponding ones of the optical elements in each of the sets.

(6) In the optical subassembly according to (5), the corresponding ones of the optical elements in each of the sets may be a monolithically integrated array element.

(7) In the optical subassembly according to (6), the array element may include a submount on which the corresponding ones of the optical elements are mounted.

(8) The optical subassembly according to (6) or (7) may further include some integrated circuits. Each of the integrated circuits may be connected to the corresponding ones of the optical elements in a corresponding one of the sets.

(9) The optical subassembly according to any one of (1) to (8) may further include a lens placed between each of the optical elements and a corresponding one of the first input/output sections.

(10) An optical module may include some optical subassemblies. At least one of the optical subassemblies may be the optical subassembly according to any one of (1) to (9).

(11) An optical multiplexer/demultiplexer, for converting between signal beams and a multiplexed signal beam, may include a light transmission body with a first surface and a second surface parallel and opposed to each other; some beam splitters on the first surface; a first reflector on the first surface and between the beam splitters; and a second reflector on the second surface. The light transmission body may pass light to be reflected on the beam splitters, the first reflector, and the second reflector, the light propagating between the first surface and the second surface. The light transmission body may have some first input/output sections on the first surface for inputting or outputting the respective signal beams, the light transmission body having a second input/output section on the second surface for inputting or outputting the multiplexed signal beam. Each of the beam splitters may be placed at a corresponding one of the first input/output sections to pass a corresponding one of the signal beams. The first reflector may stay away from any one of the first input/output sections.

(12) In the optical multiplexer/demultiplexer according to (11), the beam splitters may be optical filters. The first reflector and the second reflector may be reflective films.

(13) In the optical multiplexer/demultiplexer according to (11) or (12), the first input/output sections may fall into some groups, each of which includes corresponding ones of the first input/output sections. the closest pair of the first input/output sections in an adjacent pair of the groups may have a greater pitch therebetween than another pitch at which an adjacent pair of the corresponding ones of the first input/output sections in each of the groups is placed. the light transmission body may have a non-input/output section between the adjacent pair of the groups. the first reflector may be placed at the non-input/output section. the non-input/output section and a corresponding one of the first input/output sections next to each other may have a pitch therebetween equal to the pitch at which the adjacent pair of the corresponding ones of the first input/output sections in each of the groups is placed.

(14) In the optical multiplexer/demultiplexer according to (13), the non-input/output section may include some non-input/output sections. The first reflector may be placed at each of the non-input/output sections. An adjacent pair of the non-input/output sections may have a pitch therebetween equal to the pitch at which the adjacent pair of the corresponding ones of the first input/output sections in each of the groups is placed.

DETAILED DESCRIPTION

Hereinafter, some embodiments will be described with reference to drawings, where the same element or an equivalent element bears the same reference number and repetitive description thereof will be omitted.

First Embodiment

Figure 1:
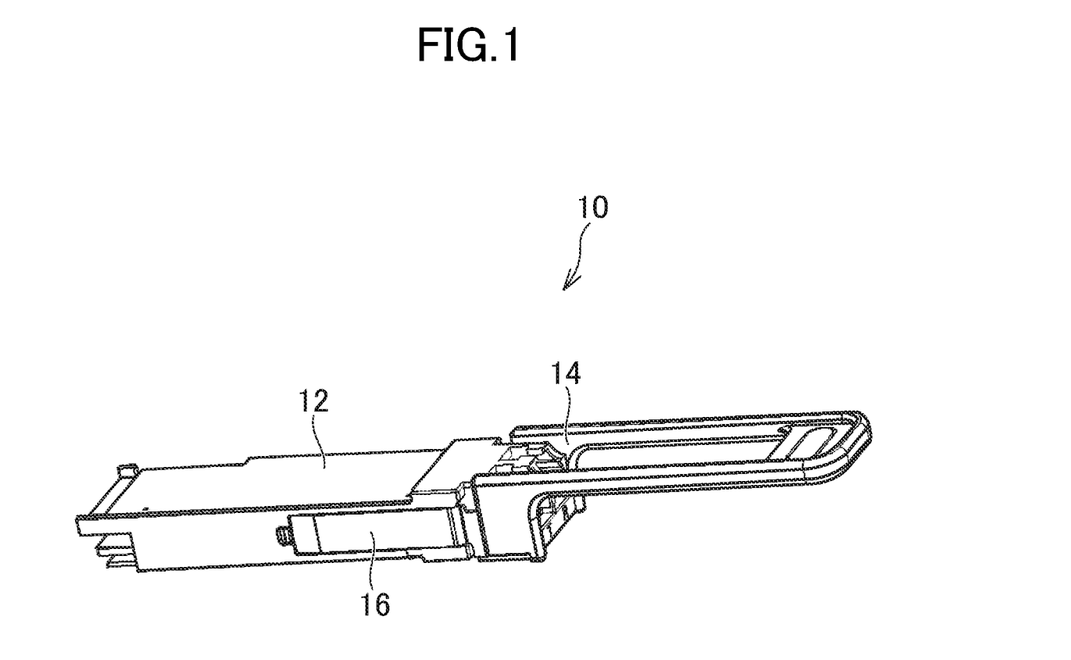
FIG. 1 is an external view of an optical module in accordance with a first embodiment.

FIG. 1 is an external view of an optical module 10 in accordance with a first embodiment. The optical module 10 is an optical transmitter and receiver (optical transceiver) with a bit rate of 100-Gbit/s-class, having optical transmitting and receiving functions, based on a multi-source agreement (MSA) on Quad Small Form-factor Pluggable 28 (QSFP28). The optical module 10 has a contour consisting of parts such as a case 12, a pull-tab 14, and a slider 16.

Figure 2:
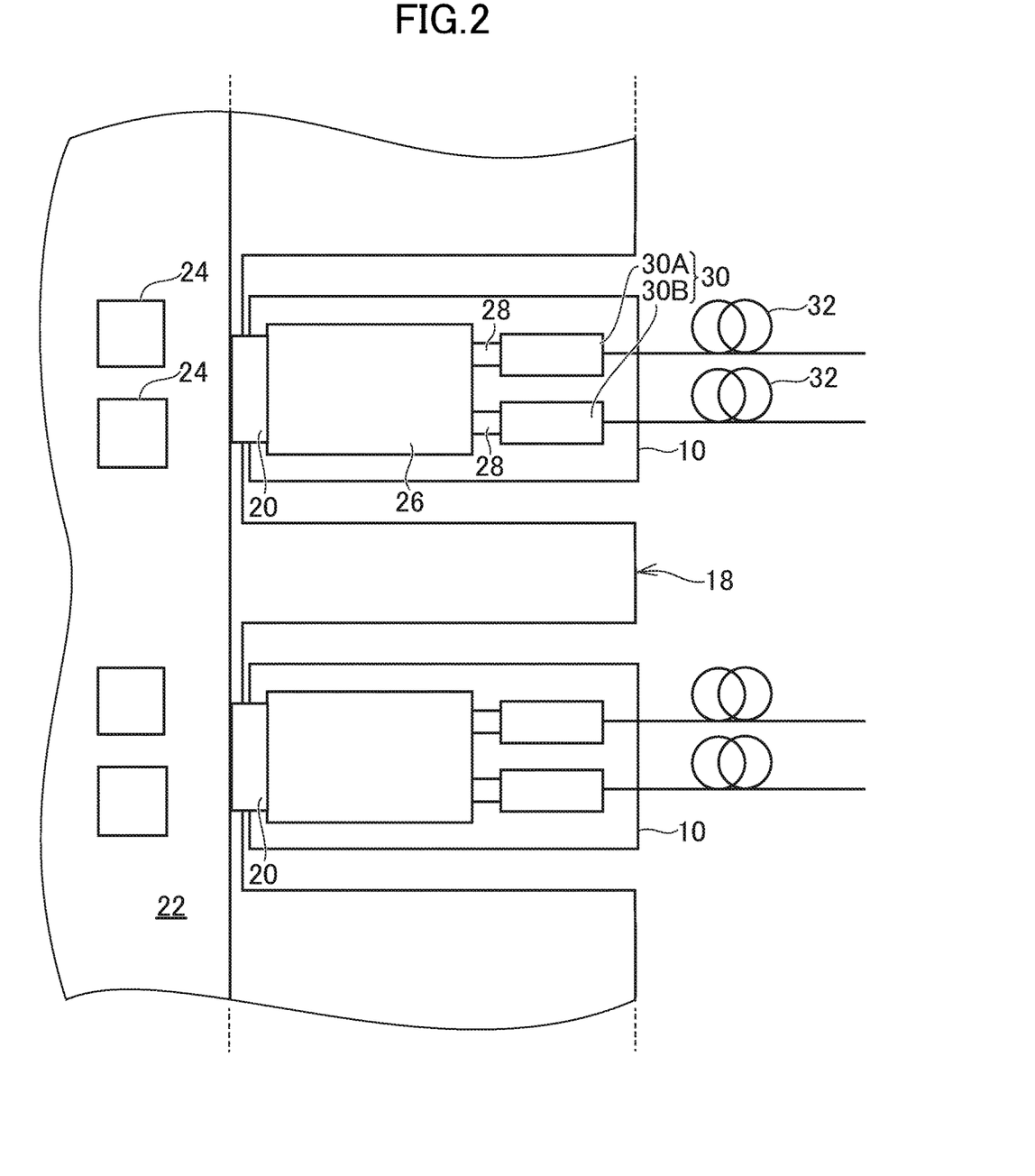
FIG. 2 is a schematic configuration diagram of an optical transmission device equipped with the optical module in the first embodiment.

FIG. 2 is a schematic configuration diagram of an optical transmission device 18 equipped with the optical module 10 in the first embodiment. The optical transmission device 18 is connected to some optical modules 10 with respective electric ports 20. The optical transmission device 18 is a large-capacity router or a switch. The optical transmission device 18 may have an exchange function and be installed at a base station. The optical transmission device 18 receives reception data (electric signals for reception) from the optical module 10, determines where to transmit what data by using a driver IC (integrated circuit) 24 on a circuit substrate 22, generating transmission data (electric signals for transmission), and transmits the data to a corresponding one of the optical modules 10.

The optical module 10 has a printed circuit board 26, a flexible printed circuit board 28, and some optical subassemblies 30 for converting between an optical signal and an electric signal, at least one from another. The optical subassemblies 30 includes any one of a transmitter optical subassembly (TOSA) with an optical transmitting function, a receiver optical subassembly (ROSA) with an optical receiving function, and a bi-directional optical subassembly (BOSA) with optical transmitting and receiving functions.

The printed circuit board 26 is a rigid substrate without flexibility. The printed circuit board 26 and the optical subassemblies 30 are connected with the respective flexible printed circuit board 28. An electric signal is transmitted from the optical subassembly 30A through the flexible printed circuit board 28 to the printed circuit board 26, whereas another electric signal is transmitted from the printed circuit board 26 through the flexible printed circuit board 28 to the optical subassembly 30B. The optical subassembly 30 has a photoelectric conversion element for converting between the optical signal and the electric signal, at least one from another. A photoelectric conversion element to convert the electric signal into the optical signal is a light-emitting element, whereas another photoelectric conversion element to convert the optical signal into the electric signal is a light-receiving element. The optical subassembly 30 includes at least one of the light-emitting element and the light-receiving element (e.g. both). The optical subassembly 30 is connected to an optical fiber 32 for inputting/outputting the optical signal.

Figure 3:
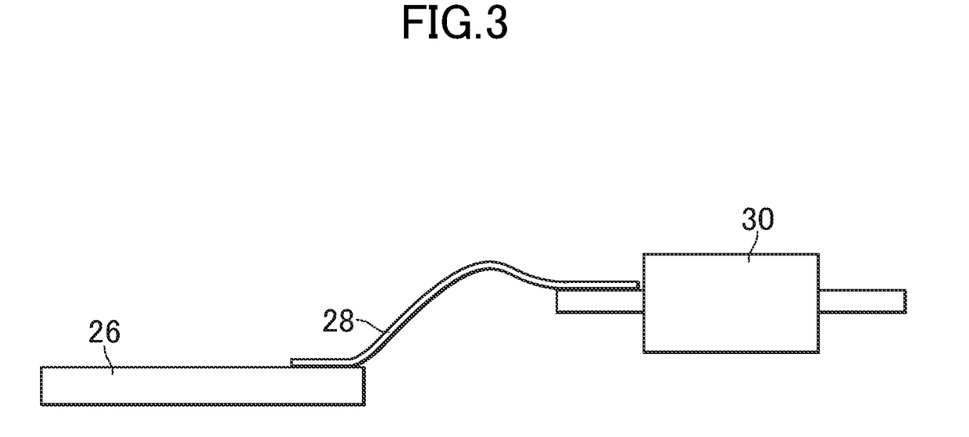
FIG. 3 is a schematic view of an optical subassembly, a printed circuit board, and a flexible printed circuit board.

FIG. 3 is a schematic view of an optical subassembly 30, a printed circuit board 26, and a flexible printed circuit board 28. The optical subassembly 30 is connected to the flexible printed circuit board 28 at its one end. The flexible printed circuit board 28 at its other end overlaps with and is electrically connected to the printed circuit board 26.

Figure 4:
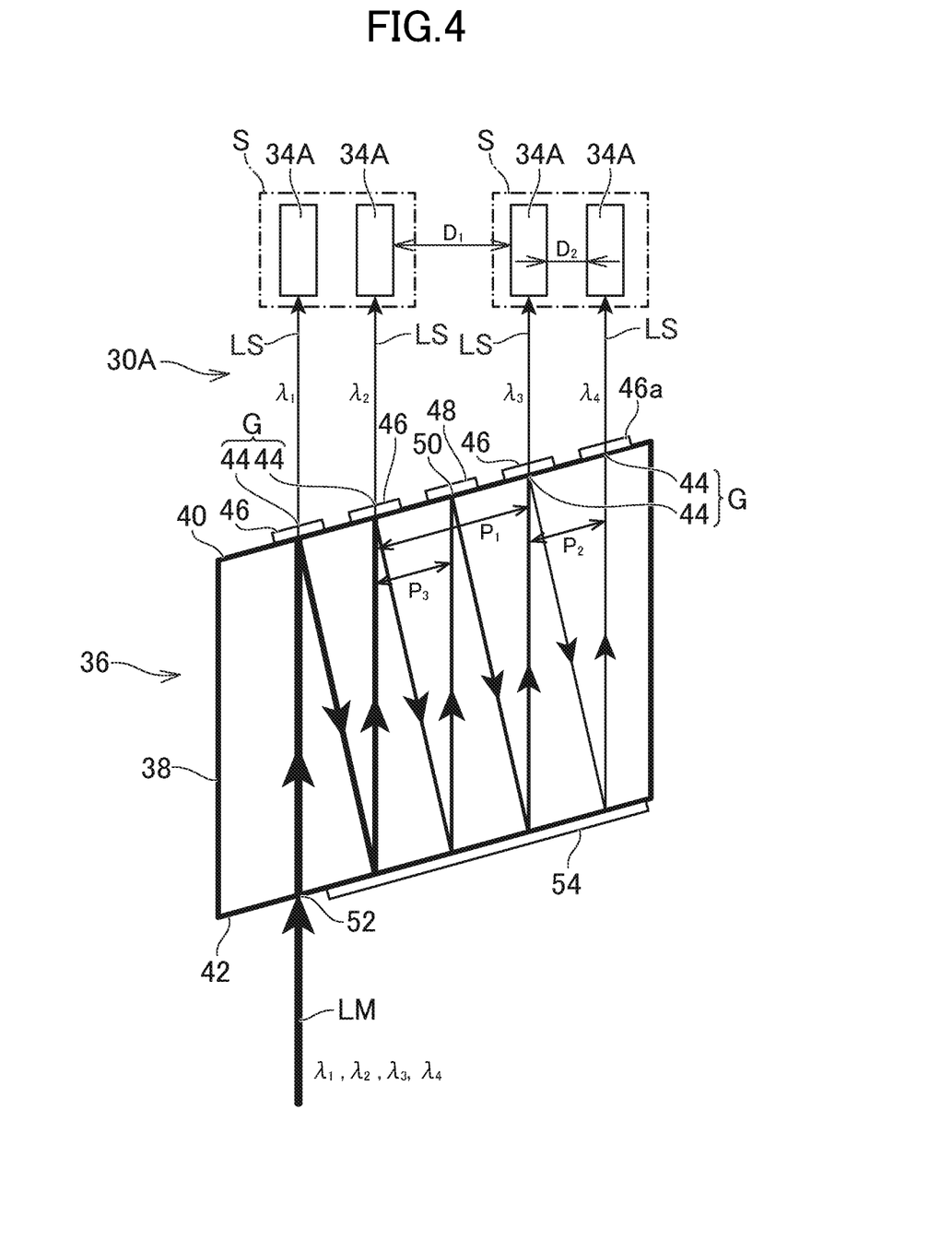
FIG. 4 is a diagram of the optical subassembly as a receiver optical subassembly.

FIG. 4 is a diagram of the optical subassembly 30A as a receiver optical subassembly. The optical subassembly 30A has some optical elements 34A for receiving respective signal beams LS with different wavelengths λ1-λ4. The optical elements 34A are light-receiving elements. The optical elements 34A fall into some sets S, each of which includes some of the optical elements 34A. The closest optical elements 34A in adjacent sets S are separated from each other at a distance D1 greater than a distance D2, at which adjacent optical elements 34A in each set S are separated from each other.

The optical subassembly 30A has an optical multiplexer/demultiplexer 36 for demultiplexing a multiplexed signal beam LM into some signal beams LS. The multiplexed signal beam LM is a beam in which beams with different wavelengths are combined. The optical multiplexer/demultiplexer 36 has a light transmission body 38. The light transmission body 38 has a first surface 40 and a second surface 42, which are parallel to and opposed to each other. The light transmission body 38 has some first input/output sections 44 on the first surface 40 for outputting the respective signal beams LS.

The first surface 40 has some beam splitters 46 formed thereon. The beam splitters 46, which may be formed of insulating films, are optical filters for passing light with respective different wavelengths λ1-λ4. Each beam splitter 46 passes a corresponding one of the signal beams LS, reflecting the remaining ones that include one or more signal beams LS to go through corresponding one or more beam splitters 46 located more downstream in a traveling direction of the signal beams LS. Each beam splitter 46, however, may have a characteristic of not passing one or more signal beams LS that have already passed corresponding one or more beam splitters 46 located more upstream in a travelling direction of the signal beams LS because they are not incident thereinto. Each beam splitter 46 is located at a corresponding one of the first input/output sections 44. Additionally, the beam splitter 46a is not always necessary at the last first input/output section 44 for outputting the remaining one of the signal beams LS after demultiplexing.

The first surface 40 has a first reflector 48 provided thereon and between the beam splitters 46. Or, at least one beam splitter 46 is provided on each of both sides of the first reflector 48. The first reflector 48 is a reflective film but may be a beam splitter capable of passing light not coming thereto as long as it reflects all the light really coming thereto. For example, the beam splitter 46, located more upstream than the first reflector 48 (left side in FIG. 4) in a travelling direction of the signal beams LS, may continuously expand and replace the first reflector 48. The first reflector 48 stays away from any one of the first input/output sections 44. The first reflector 48 is located at a non-input/output section 50 where none of the signal beams LS are input/output. Every signal beam LS incident on the first reflector 48, except for any signal beam LS that have already passed through the beam splitter 46, is reflected on the first reflector 48. The first reflector 48 may have a characteristic capable of reflecting all the signal beams LS.

The light transmission body 38 has a second input/output section 52 provided on the second surface 42 for inputting the multiplexed signal beam LM therein. The second surface 42 has a second reflector 54 provided thereon. The second reflector 54 reflects the signal beams LS. The second reflector 54 is a reflective film. The signal beams LS, which propagate between the first surface 40 and the second surface 42 in the light transmission body 38, are reflected on the beam splitters 46, the first reflector 48, and the second reflector 54.

The first input/output sections 44 fall into some groups G. Each group G includes some first input/output sections 44. The closest first input/output sections 44 in adjacent groups G are arranged at a pitch P1. The pitch P1 is larger than a pitch P2 at which adjacent first input/output sections 44 are arranged in each group G. The light transmission body 38 has a non-input/output section 50 between adjacent groups G. The non-input/output section 50 and a first input/output section 44 adjacent to each other are arranged at a pitch P3. The pitch P3 is equivalent to the pitch P2 at which the adjacent first input/output sections 44 are arranged in each group G.

The embodiment has the first reflector 48 between the beam splitters 46, making enough space due to unnecessity of providing the optical element 34A to be opposed to the first reflector 48. This makes it possible to integrally arrange the optical elements 34A in each set S, curbing decrease in a yield rate or increase in a manufacturing cost.

Figure 5:
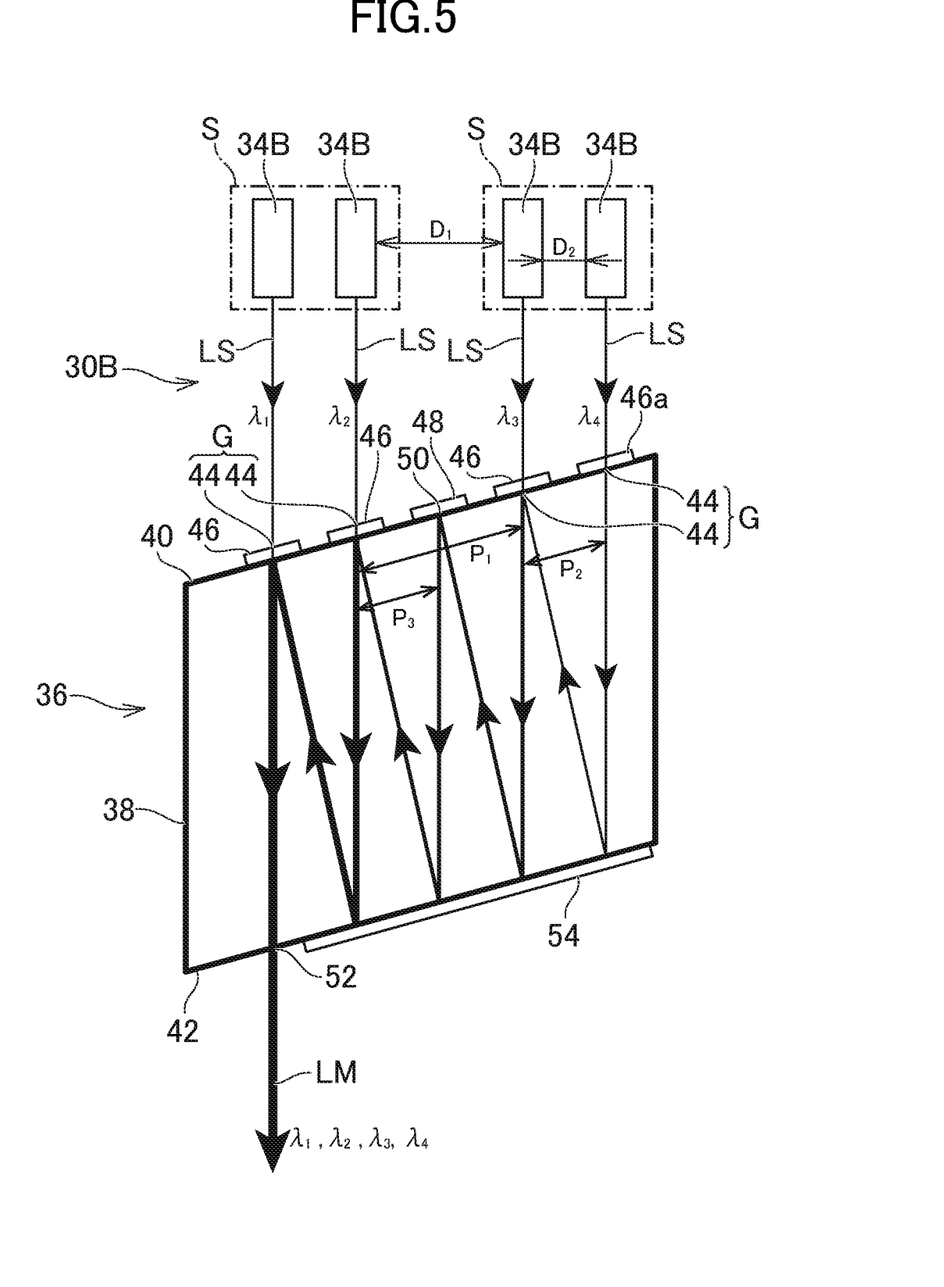
FIG. 5 is a diagram of the optical subassembly as a transmitter optical subassembly.

FIG. 5 is a diagram of the optical subassembly 30B as a transmitter optical subassembly. The optical subassembly 30B has some optical elements 34B for outputting respective signal beams LS with different wavelengths λ1-λ4. The content of the optical element 34A (light-receiving element) in FIG. 4 is applicable to the optical element 34B, except to be a light-emitting element.

The optical subassembly 30B has an optical multiplexer/demultiplexer 36 for multiplexing the signal beams LS into the multiplexed signal beam LM. The light transmission body 38 has the first input/output sections 44 on the first surface for inputting respective signal beams LS. The light transmission body 38 has the second input/output section 52 on the second surface 42 for outputting the multiplexed signal beam LM. The content of the light transmission body 38 in FIG. 4 is applicable to the light transmission body 38, except that the signal beams LS and the multiplexed signal beam LM travel in an opposite direction.

Second Embodiment

Figure 6:
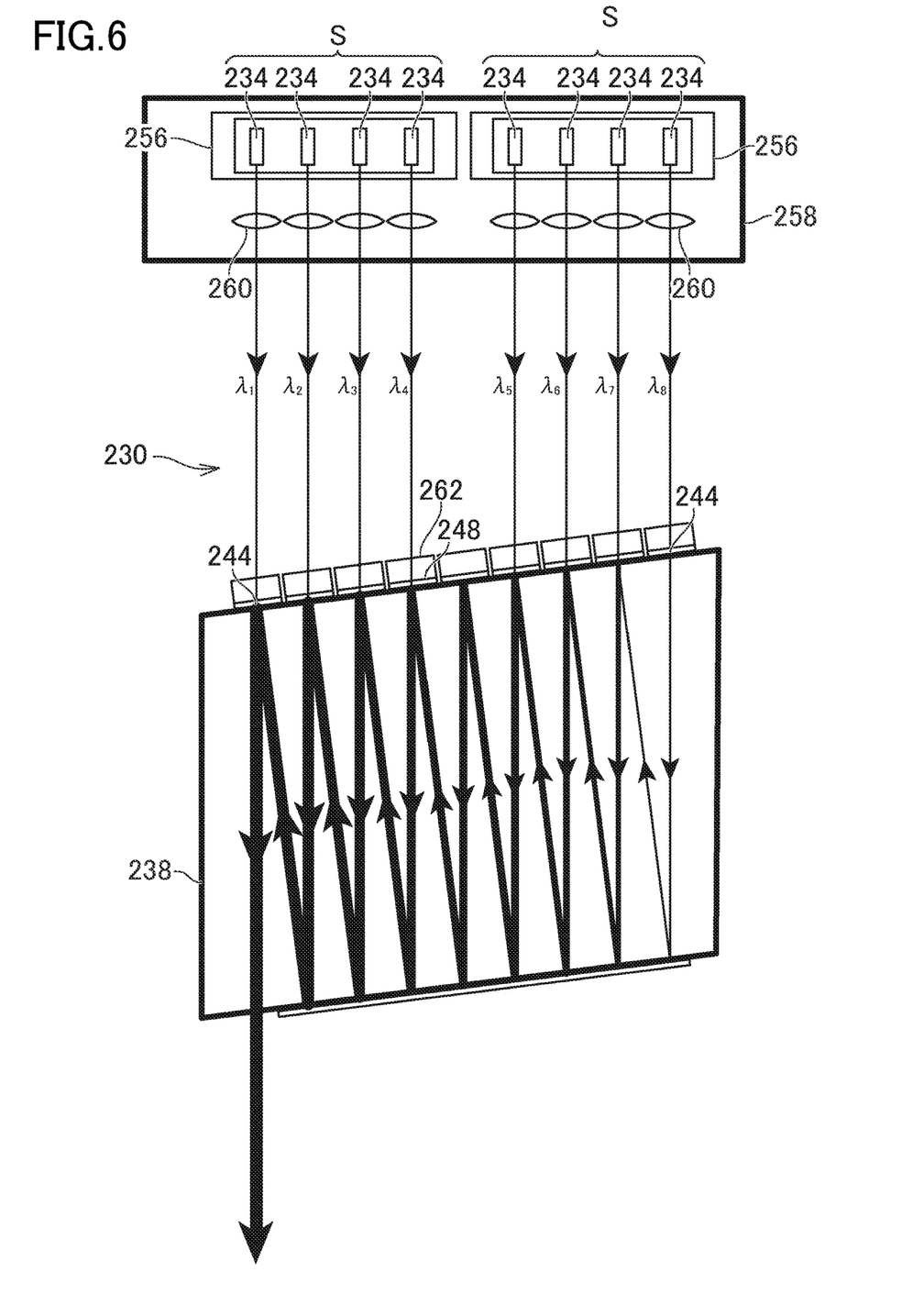
FIG. 6 is a schematic view of an optical subassembly in accordance with a second embodiment.

FIG. 6 is a schematic view of an optical subassembly 230 in accordance with a second embodiment. In the embodiment, the optical elements 234 in each set S are a monolithically integrated array element. The optical elements 234 are mounted on a submount 256. Some submounts 256 are mounted on a support member 258. The support member 258 may have its temperature controlled by an unillustrated thermoelectric cooler (TEC). The support member 258 has some lenses 260 mounted thereon. Each lens 260 is located between the corresponding optical element 234 and the corresponding first input/output section 244. The lenses 260 may be an integrated lens array. The beam splitters 248, which have respective characteristics for wavelengths λ1-λ8 of the signal beams LS, are prepared to be formed (e. g. by deposition or by sputtering) on respective light-transmitting chips 262 (e.g. glass substrate). Then, the light-transmitting chips 262 are attached to the light transmission body 238 with the beam splitters 248 opposed to the light transmission body 238. The content of the first embodiment is applicable hereto. This configuration includes two array elements each of which has four elements integrated therein, not an array element with eight elements integrated therein, curbing an impact on decrease in the manufacturing yield rate of optical elements. Still, not having eight separate optical elements can achieve an effect such as reduction of parts count. The embodiment has the eight optical elements divided into two sets but may alternatively have them divided into four sets to achieve the same effect. Even more, it goes without saying that more than eight optical elements are applicable thereto.

Third Embodiment

Figure 7:
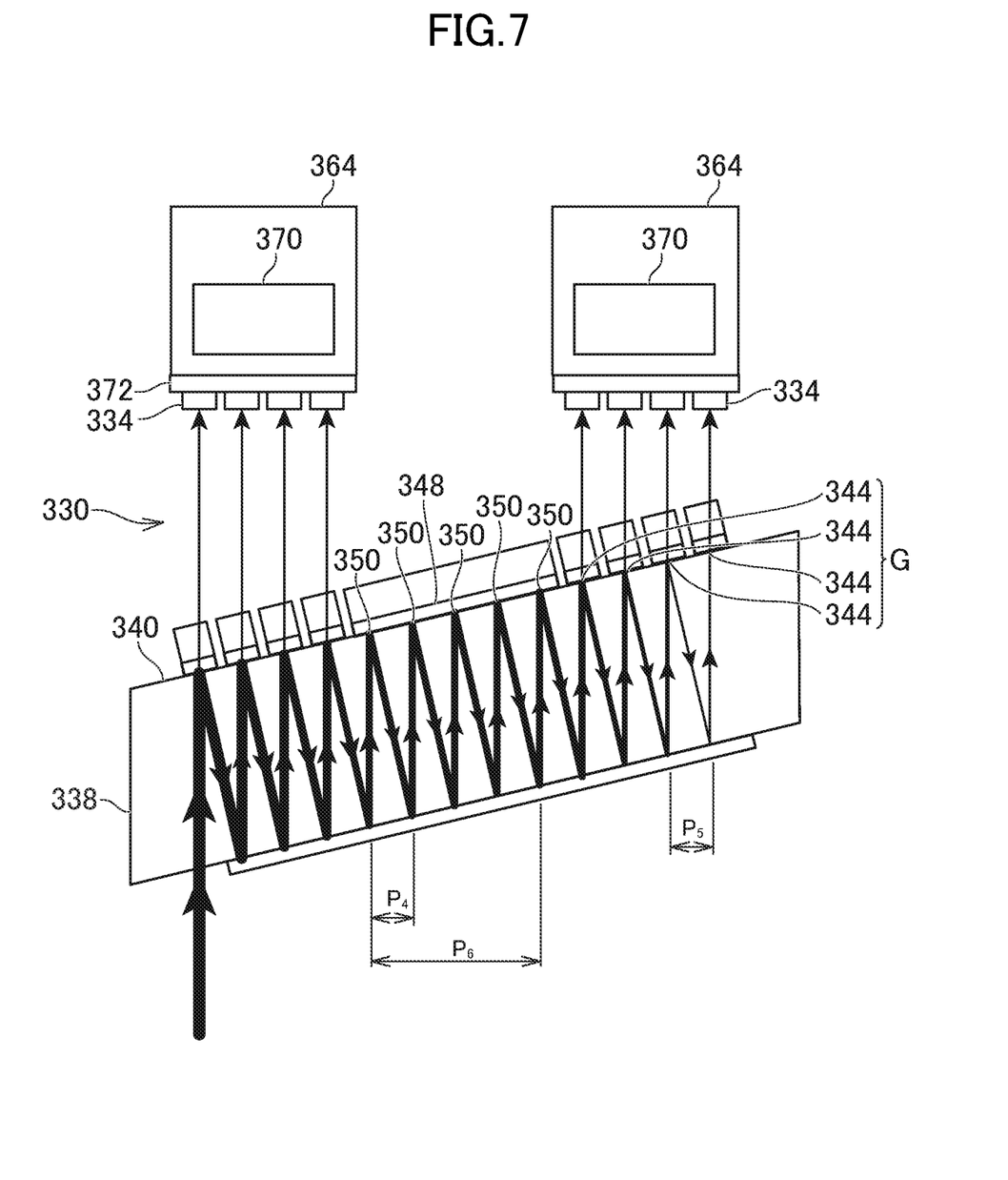
FIG. 7 is a schematic view of an optical subassembly in accordance with a third embodiment.

FIG. 7 is a schematic view of an optical subassembly 330 in accordance with a third embodiment. In the embodiment, the non-input/output sections 350 are arranged on the first surface 340 of the light transmission body 338. The first reflector 348 is located at each of the non-input/output sections 350. The first reflector 348 is continuously integral over the non-input/output sections 350. The first reflector 348 reflects the signal beam LS multiple times. The pitch P4 of an adjacent pair of the non-input/output sections 350 is equal to the pitch P5 of an adjacent pair of the first input/output sections 344 in each group G. The pitch P6 of the most remote non-input/output sections 350 is integer multiple of the pitch P4 or the pitch P5.

Figure 8:
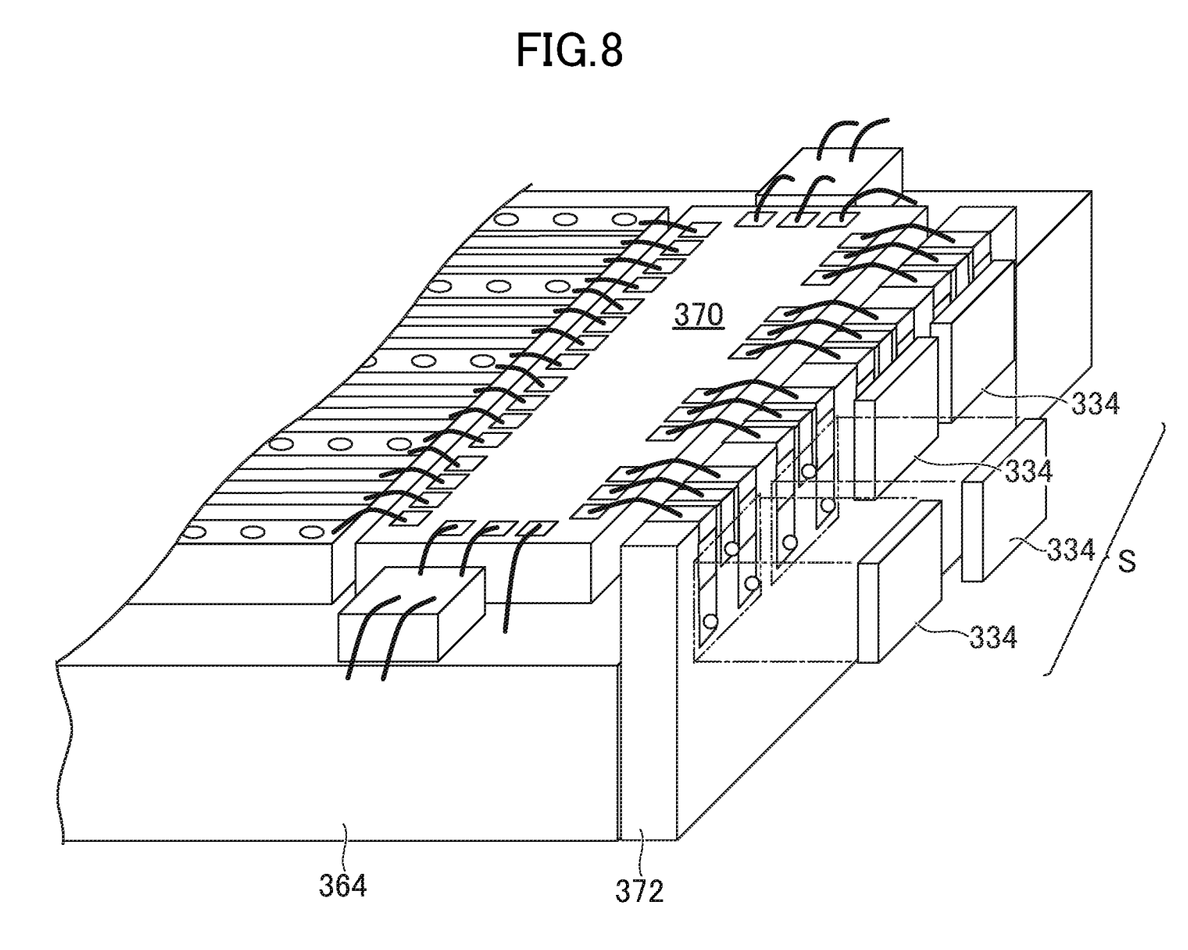
FIG. 8 is a perspective view of optical elements included in the optical subassembly in FIG. 7.

FIG. 8 is a perspective view of optical elements 334 included in the optical subassembly 330 in FIG. 7. The optical elements 334 are individually separated chips. An integrated circuit 370 is mounted on a top surface of the substrate 364. A carrier 372 stands up to be attached to a side edge surface of the substrate 364. Some optical elements 334 are mounted on the carrier 372. The optical subassembly 330 has some integrated circuits 370. Each integrated circuit 370 is connected to the optical elements 334 in each set S.

While there have been described what are at present considered to be certain embodiments, it will be understood that various modifications may be made thereto, and it is intended that the appended claims cover all such modifications as fall within the true spirit and scope of the invention.

What is claimed is:
1. An optical subassembly comprising:
    a plurality of optical elements for inputting or outputting signal beams,
        each optical element, of the plurality of optical elements, being configured to input or output a signal beam, of the signal beams, with a different wavelength than other signal beams, of the signal beams, to be input or output by other optical elements of the plurality of optical elements; and
    an optical multiplexer/demultiplexer for converting between the signal beams and a multiplexed signal beam,
        the optical multiplexer/demultiplexer including:
            a light transmission body with a first surface and a second surface parallel to the first surface,
            a plurality of beam splitters on the first surface,
            a first reflector continuously integral over a plurality of non-input/output sections of the first surface,
                wherein the plurality of non-input/output sections are between a pair of the plurality of beam splitters, and
            a second reflector on the second surface,
                wherein the light transmission body passes light to be reflected on the plurality of beam splitters, the first reflector, and the second reflector, the light propagating between the first surface and the second surface,
            wherein the light transmission body comprises a plurality of first input/output sections on the first surface for inputting or outputting the signal beams,
            wherein the plurality of first input/output sections include a first group of first input/output sections and a second group of first input/output sections,
            wherein the first reflector is disposed between the first group and the second group,
            wherein the light transmission body comprises a second input/output section on the second surface for inputting or outputting the multiplexed signal beam,
            wherein each of the plurality of beam splitters are located at a corresponding first input/output section, of the plurality of first input/output sections, to pass a corresponding signal beam of the signal beams, and
            wherein a pitch between an adjacent pair of the plurality of non-input/output sections is equal to a pitch between an adjacent pair of the first group.
2. The optical subassembly of claim 1, wherein the plurality of beam splitters are optical filters, and
    wherein the first reflector and the second reflector are reflective films.
3. The optical subassembly of claim 1,
    wherein a pitch between a particular non-input/output section, of the plurality of non-input/output sections, and a particular input/output section of the first group is equal to the pitch between the adjacent pair of the first group.
4. The optical subassembly of claim 1, wherein the plurality of optical elements comprise a first set of optical elements and a second set of optical elements, and
    wherein a distance between a first optical element, of the first set, and a second optical element, of the second set, is greater than a distance between an adjacent pair of optical elements in the first set of optical elements, the first optical element being adjacent to the second optical element.
5. The optical subassembly of claim 1, wherein each set of the plurality of optical elements is a monolithically integrated array element.
6. The optical subassembly of claim 5, wherein the monolithically integrated array element includes a corresponding set of the plurality of optical elements being mounted on a submount.
7. The optical subassembly of claim 1, further comprising:
    a plurality of integrated circuits,
        wherein each of the plurality of integrated circuits is connected to a corresponding set of the plurality of optical elements.
8. The optical subassembly of claim 1, further comprising:
    a plurality of lenses,
        each lens, of the plurality of lenses, being disposed between a corresponding optical element, of the plurality of optical elements, and the corresponding first input/output section.
9. An optical module comprising a plurality of optical subassemblies, wherein at least one of the plurality of optical subassemblies is the optical subassembly of claim 1.
10. The optical subassembly of claim 1, wherein each of the plurality of beam splitters comprises insulating films.

11. The optical subassembly of claim 1, wherein a first beam splitter, of the plurality of beam splitters, passes a first signal beam, of the signal beams, with a first wavelength, and wherein a second beam splitter, of the plurality of beam splitters, passes a second signal beam, of the signal beams, with a second wavelength.

12. The optical subassembly of claim 11, wherein the first beam splitter reflects any signal beam, of the signal beams, with a wavelength different from the first wavelength, and wherein the second beam splitter reflects any signal beam, of the signal beams, with a wavelength different from the second wavelength.

13. The optical subassembly of claim 1, wherein each of the plurality of beam splitters is disposed between a glass substrate and the light transmission body.

14. An optical multiplexer/demultiplexer for converting between signal beams and a multiplexed signal beam, comprising:

a light transmission body with a first surface and a second surface parallel to the first surface;
a plurality of beam splitters on the first surface;
a first reflector continuously integral over a plurality of non-input/output sections of the first surface,
   wherein the plurality of non-input/output sections are between a pair of the plurality of beam splitters; and
a second reflector on the second surface,
   wherein the light transmission body passes light to be reflected on the plurality of beam splitters, the first reflector, and the second reflector,
      the light propagating between the first surface and the second surface,
   wherein the light transmission body comprises a plurality of first input/output sections on the first surface for inputting or outputting the signal beams,
   wherein the plurality of first input/output sections include a first group of first input/output sections and a second group of first input/output sections,
   wherein the first reflector is disposed between the first group and the second group,
   wherein the light transmission body comprises a second input/output section on the second surface for inputting or outputting the multiplexed signal beam,
   wherein each of the plurality of beam splitters are located at a corresponding first input/output section, of the plurality of first input/output sections, to pass a corresponding signal beam of the signal beams, and
   wherein a pitch between an adjacent pair of the plurality of non-input/output sections is equal to a pitch between an adjacent pair of the first group.

15. The optical multiplexer/demultiplexer of claim 14, wherein the plurality of beam splitters are optical filters, and wherein the first reflector and the second reflector are reflective films.

16. The optical multiplexer/demultiplexer of claim 14, wherein a pitch between a particular non-input/output section, of the plurality of non-input/output sections, and a particular input/output section of the first group is equal to the pitch between the adjacent pair of the first group.

17. The optical multiplexer/demultiplexer of claim 14, wherein each of the plurality of beam splitters comprises insulating films.

18. The optical multiplexer/demultiplexer of claim 14, wherein a first beam splitter, of the plurality of beam splitters, passes a first signal beam, of the signal beams, with a first wavelength, and wherein a second beam splitter, of the plurality of beam splitters, passes a second signal beam, of the signal beams, with a second wavelength.

19. The optical multiplexer/demultiplexer of claim 18, wherein the first beam splitter reflects any signal beam, of the signal beams, with a wavelength different from the first wavelength, and wherein the second beam splitter reflects any signal beam, of the signal beams, with a wavelength different from the second wavelength.

20. The optical multiplexer/demultiplexer of claim 14, wherein each of the plurality of beam splitters is disposed on a glass substrate.

* * * * *